United States Patent

Hanna, Jr.

[15] 3,694,757

[45] Sept. 26, 1972

[54] PSEUDO-RANDOM CODE RECOGNITION RECEIVER

[72] Inventor: Drexel W. Hanna, Jr., Warminster, Pa.

[73] Assignee: Totuus Communications, Inc., Horsham, Pa.

[22] Filed: May 4, 1970

[21] Appl. No.: 34,161

[52] U.S. Cl...........325/466, 179/15 BA, 179/15 BY, 325/325, 331/78, 340/146.1 AL

[51] Int. Cl...........H04b 1/06

[58] Field of Search......179/15 BA, 15 BY, 15 BC, 41 A; 325/55, 64, 321, 325, 466; 340/146.1 AL; 331/78

[56] References Cited

UNITED STATES PATENTS

| | | | |
|---|---|---|---|
| 3,475,558 | 10/1969 | Cahn | 179/15 BA |
| 3,155,818 | 11/1963 | Goetz | 340/146.1 |
| 3,518,547 | 6/1970 | Filipowsky | 179/15 OR |
| 3,439,279 | 4/1969 | Guanella | 331/78 |
| 3,305,636 | 2/1967 | Webb | 179/15 BY |

OTHER PUBLICATIONS

Kramer, C., " A Low-Frequency Psuedo-Random Noise Generator," Electronic Engineering, July, 1965, pgs. 465- 467

*Primary Examiner*—Robert L. Griffin
*Assistant Examiner*—Peter M. Pecori
*Attorney*—Seidel, Gonda & Goldhammer

[57] ABSTRACT

A receiver in a communication system for receiving a data signal having a preamble and a pseudo-random code. A preamble detector detects the preamble and initiates the operation of a local pseudo-random generator. The pseudo-random generator generates a maximum length pseudo-random sequence for the number of stages of the shift register used in the pseudo-random generator. The output of each stage of the shift register in the pseudo-random generator is fed to an exclusive OR gate. The pseudo-random code from the incoming data signal is compared with the pseudo-random code generated by the local pseudo-random code generator in an exclusive OR gate. The output of the exclusive OR gate is integrated in an integrating means. When the output of the integrator means exceeds a predetermined level, an alarm is energized.

5 Claims, 4 Drawing Figures

INVENTOR
DREXEL W. HANNA, JR.
BY
Seidel, Gonda & Goldhammer
ATTORNEYS.

INVENTOR
DREXEL W. HANNA, JR.
BY
Seidel, Gonda & Goldhammer
ATTORNEYS.

INVENTOR
DREXEL W. HANNA, JR.

BY
Seidel, Gonda & Goldhammer
ATTORNEYS.

PSEUDO-RANDOM CODE RECOGNITION RECEIVER

This invention relates to a receiver for a communication system. More particularly, this invention relates to a receiver for use in a multiple subscriber one way communication system.

The present invention relates to a receiver that uniquely responds to a coded signal broadcast by a transmitter. The communication system may take on several forms. For example, a large number of the receivers to which the present invention relates may be at remote locations. It may be desirable to contact one of those receivers. Accordingly, the transmitter generates a signal unique to that particular receiver. All of the receivers accept the signal but only the receiver to be contacted responds. The response can take on many forms. In the embodiment described herein an audio signal is generated. In other forms, a switch may be closed to initiate a machine function. And in still another form a further electronic process may be initiated. In yet another form, a transmitter may be opened. Those skilled in the art will immediately recognize that there are any number of responses which can be initiated by the receiver.

The basic problem in any such communication system is to maximize the number of unique receivers that can be contacted. Each receiver must be capable of uniquely receiving its signal, and only its signal. Stated otherwise, each receiver must be capable of rejecting all other signals.

In accordance with the present invention a receiver capable of distinguishing one of sixteen thousand addresses is provided. This is accomplished by a matched filter receiver of band width $1/\tau$, where $\tau$ is the period of the sequence.

In particular, the present invention incorporates a programmable pseudo-random sequence generator whose output is compared with the incoming data in an exclusive OR circuit with the results of these individual bit comparisons being integrated across the time period of the sequence.

For the purpose of illustrating the invention, there is shown in the drawings a form which is presently preferred; it being understood, however, that this invention is not limited to the precise arrangements and instrumentalities shown.

Referring now to the drawings in detail, wherein like numerals indicate like elements, there is shown in FIG. 1 a block diagram of a receiver constructed in accordance with the present invention designated generally as 10.

Figure 1:
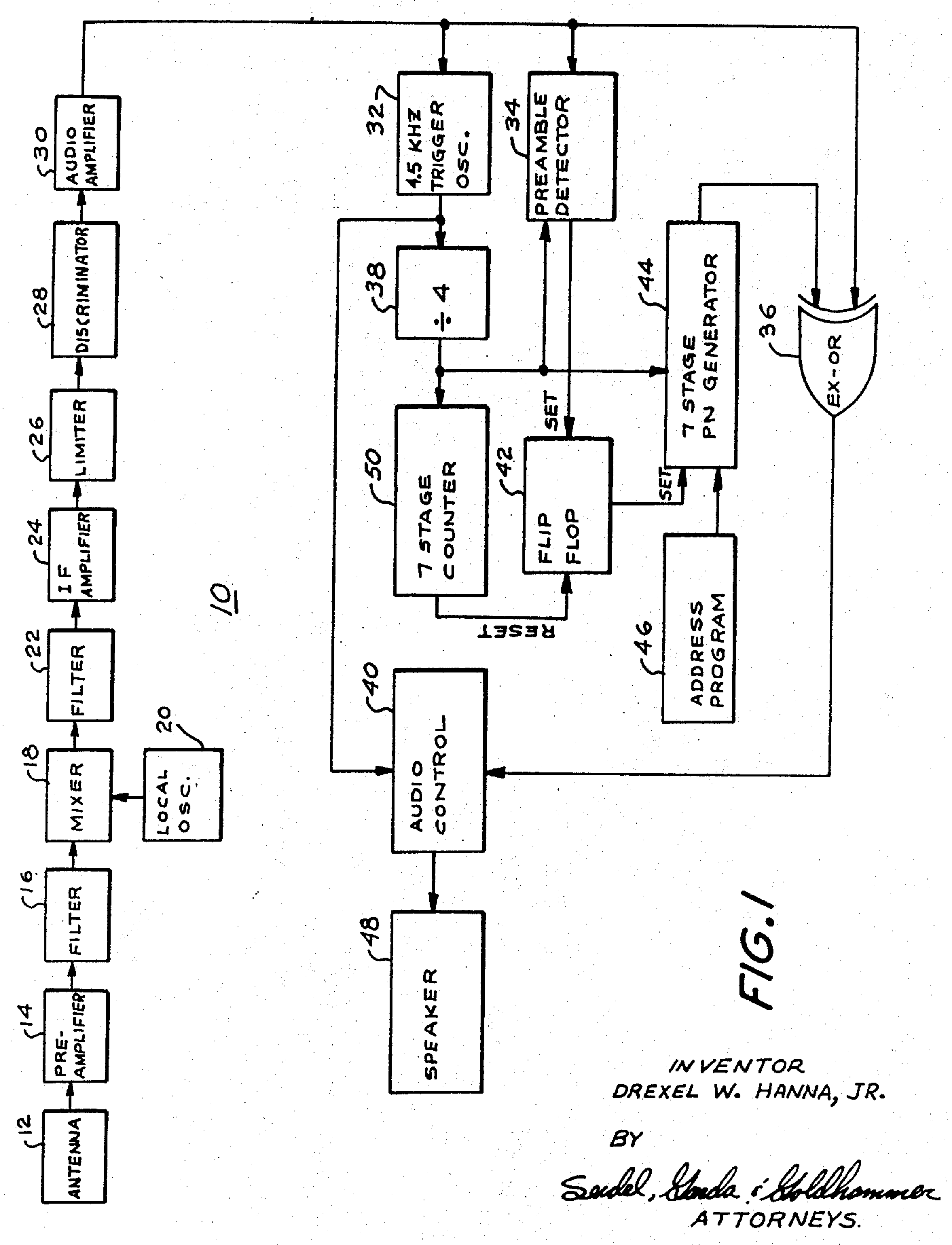
FIG. 1 is a block diagram of the receiver constructed in accordance with the present invention.

All signals broadcast by a remote transmitter are received by the antenna 12 which may, if desired, be a ferrite antenna of the conventional type. The signal received by the antenna 12 is amplified in the preamplifier 14 and filtered by the filter 16. Filter 16 may be a crystal monolithic filter which preforms a conventional preselection function. Thereafter the signal is passed through a mixer 18 connected to local oscillator 20. The signal is further limited by filter 22 and I.F. amplifier 24.

The signal derived from I.F. amplifier 24 is passed through a limiter 26 which preferably is of the two transistor type and a discriminator circuit 28. The limiter 26 performs its conventional function in that it removes unwanted amplitude variations. The discriminator 28 further removes unwanted frequency variations. The resulting audio frequency signal is amplified by audio amplifier 30 and passed to both the trigger oscillator 32 as well as the preamble detector 34. Still further, the signal is applied to one terminal of the exclusive OR circuit 36. As those skilled in the art know, an exclusive OR circuit is one for which the functional relationship is $$f(A,B) = (A+B)\,(\overline{AB})$$

Stated otherwise, its truth table differs from an OR circuit in that it has an 0 output when there is a matching signal on both of its inputs. A conventional OR circuit has a 1 output when there is a 1 signal on both of its inputs. It should be particularly noted that the detected signal is in all cases being applied to one terminal of the exclusive OR circuit 36.

The trigger oscillator 42 is triggered by the incoming signal, and it commences to generate a 4.55 KHz signal. This signal is passed through the divide circuit 38 which in the preferred embodiment is constructed to divide the signal by 4. Thus, the resulting output of divide circuit 38 is a signal at 1,137.5 Hz. This lower frequency signal may be referred to hereinafter as the clock signal. As shown, the 4.55 KHz signal is also applied to the audio control circuit 40 whose purpose is explained in more detail hereinafter.

The preamble detector 34 preferably comprises a shift register with decode. Its function is to detect the preamble in the message and set the flip-flop circuit 42 as indicated in FIG. 1. Setting flip-flop circuit 42 generates a pulse which in turn starts the pseudo-random sequence generator 44 (hereinafter referred to as a PN generator). The function of a PN generator is to generate a code which is unique to the particular receiver 10 in a manner described hereinafter. This particular code is applied to the other terminal of the exclusive OR circuit 36 as indicated. If there is a match between the incoming signal applied to one terminal of the exclusive OR circuit and the signal generated by the PN generator 44, a 0 appears at the output of the exclusive OR circuit 36. This output is applied to the audio control circuit 40. The particular code unique to the receiver 10 is applied to the PN generator 44 by program circuit 46 which defines the starting state of the PN generator 44. Preferably, the program circuit 44 is permanently wired.

The audio control circuit 40 includes circuitry, more particularly described hereinafter, which responds to the output of the exclusive OR 36 to set a flip-flop circuit which turns on a gate circuit. The gate circuit in turn permits the 4.55 KHz signal to be applied to the speaker 48. The speaker transduces the signal into an audible signal. This signal, in the preferred embodiment of the invention, advises the listener that he is to perform a particular function. For example, it may be used to advise a salesman to call his office. It should be understood, however, that the speaker 48 is but one example of any type of transducer which may be used. Thus, the signal may be used to initiate a machine function, give an alarm, or perform any one of a number of types of remotely controlled operations.

The counter circuit 50 is synchronized by the clock signal derived from divide circuit 38. It counts up to a predetermined number (e.g., 128) and then triggers a reset pulse. This reset pulse is applied to flip-flop 42, causing it to return to its initial mode. This resets the PN generator to its starting state (defined by the wired program) and defines the time window of the receiver.

During the countdown period, the PN generator 44 goes through its preset sequence to determine whether or not there was a match with the incoming signal. The operation of the PN generator 44 is synchronized by a clock signal derived from the divide circuit 38 as indicated.

Figure 3:
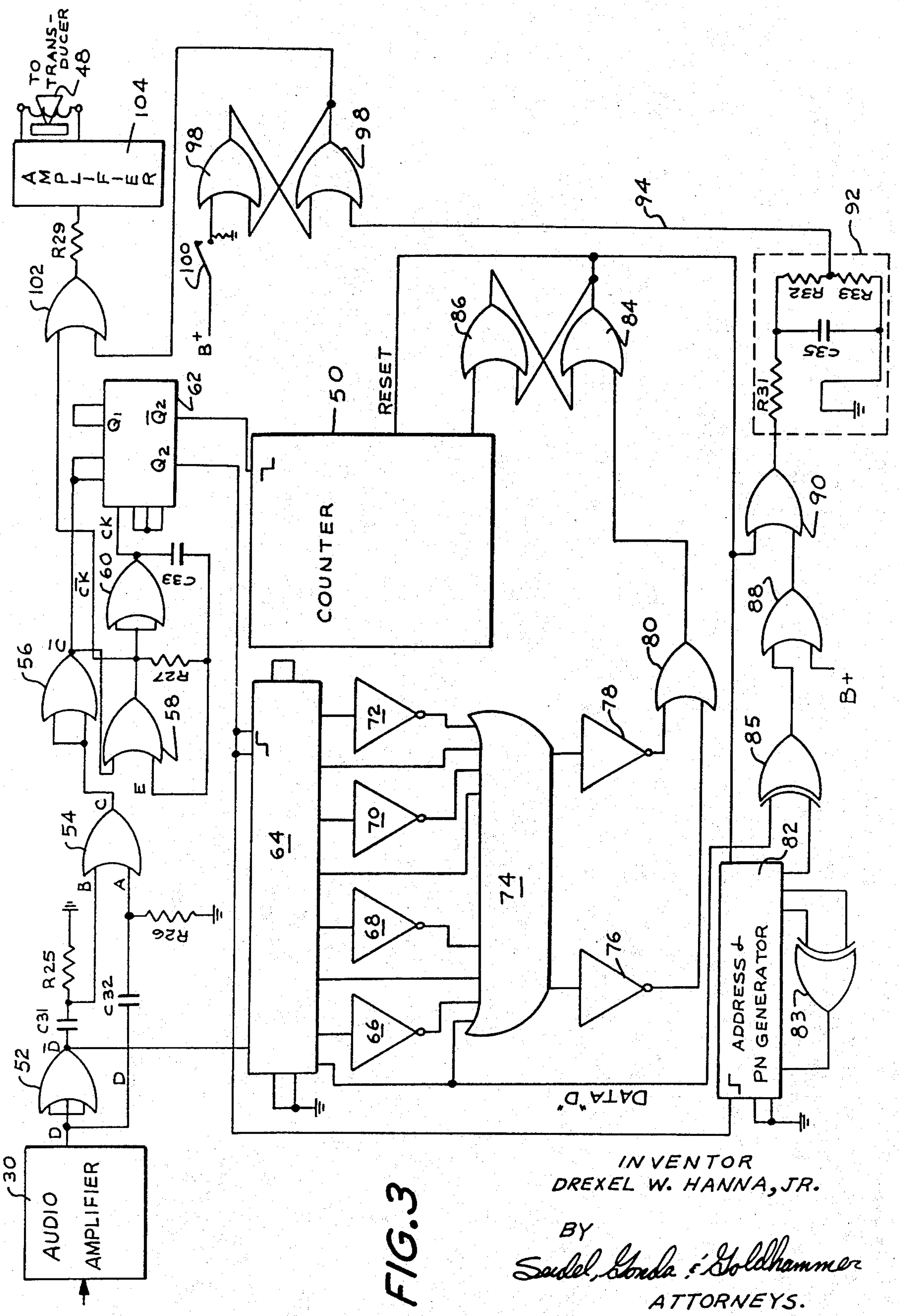
FIG. 3 is a logic diagram of the receiver constructed in accordance with the present invention.

Referring now to FIG. 3, the logic circuitry for accomplishing the functions illustrated in block form in FIG. 1 is described in detail.

Figure 2:
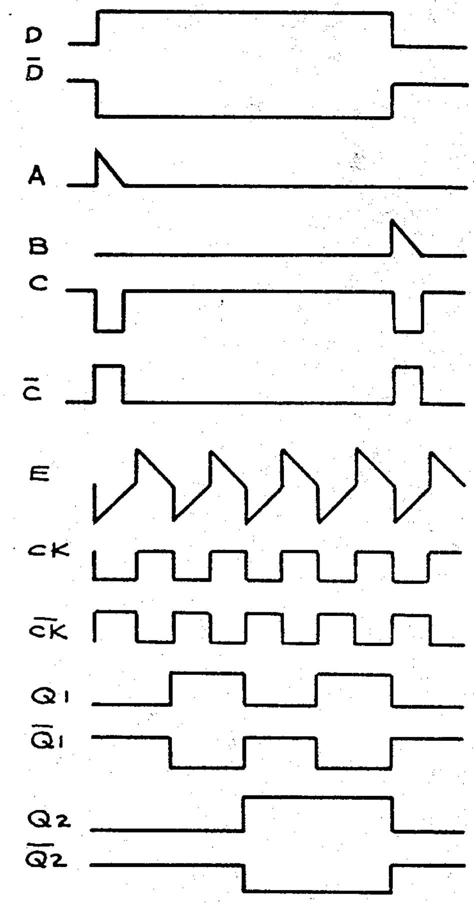
FIG. 2 is a time sequence diagram.

For purposes of simplification, the acquisition portion of the receiver illustrated in FIG. 1 is not shown in FIG. 3. The data signal D (see FIG. 2) from the audio amplifier is applied to a NOR circuit 52 which functions as an inverter in the well known manner. FIG. 2 illustrates the data signal D for purposes of showing the timing sequence herein. Thus, the output of NOR circuit 52 is an inverted signal $\overline{D}$, as shown. The inverted data signal $\overline{D}$ at the output of NOR circuit 52 is also illustrated in FIG. 2.

The signal D is applied to a first differentiating circuit consisting of capacitor C32 and resistor R26, as shown. The leading edge of the signal D generates a positive going signal A as illustrated in FIG. 2. This signal is applied to one terminal of the NOR circuit 54. In a like manner the positive going trailing edge of the inverted signal $\overline{D}$ is differentiated by the capacitor C31 and resistor R25. This signal B (see FIG. 2) is applied to the other terminal of the NOR circuit 54.

The sequential application of the positive going pulses A and B to the NOR circuit 54 results in the generation of the two square wave pulses at the output of the circuit. These square wave pulses are illustrated as C in FIG. 2. Thus, the NOR circuit 54 shapes and inverts the differentiated pulses A and B.

The pulses C are passed to the commonly connected input terminals of NOR circuit 56. Such a NOR circuit functions to invert the square wave pulses C. The inverted pulses $\overline{C}$ appear at the output of the NOR circuit 56. These pulses are illustrated in FIG. 2.

The inverted square wave pulses $\overline{C}$ are applied to one terminal of the NOR circuit 58. The output of the NOR circuit 58 is connected to the common input terminals of the NOR circuit 60 whose output is fed back through capacitor C33 to the other input terminal of NOR circuit 58. The signal fed back is represented by E in FIG. 2. The combination of NOR circuit 58 and NOR circuit 60 together with the feedback circuit provides a free running oscillator which can be triggered to form the circuit function of block 32. Stated otherwise, the presence of the signal $\overline{C}$ at one terminal of the NOR circuit 58 results in the generation of the square wave signal CK and the inverted square wave signal $\overline{CK}$ illustrated in FIG. 2.

The square wave signal CK is applied to the integrated circuit 62 which is connected to function as a divide by 4 counter. Such divide counters are well known in the art and need not be described in detail. It is sufficient to state that the NOR circuits 58 and 60 provide a square wave signal CK at 4.55 KHz. The integrated circuit 62 functions to provide a 1,137.5 Hz at its output $Q_2$. An inverted 1,137.5 Hz signal is provided at output $\overline{Q}_2$. It should also be noted that the inverted square wave pulses $\overline{C}$ are applied to the integrated circuit 62. These function as reset pulses for the divide by 4 counter. They also function to keep the 1,137.5 Hz clock signals at $Q_2$ and $\overline{Q}_2$ in phase with the data transitions.

The 1,137.5 Hz clock signal derived from terminal $Q_2$ of integrated circuit 62 is applied to the preamble detector 34. As shown in FIG. 3, the preamble detector 34 includes a shift register 64 to which the 1,137.5 Hz $Q_2$ clock signal is applied. The inverted data signal $\overline{D}$ is also applied to the shift register 64. The shift register 64 is preferably an 8 stage shift register which shifts on each positive going clock signal as indicated.

An inverter is connected to the output of every other stage of the shift register 64. Thus, the inverters 66, 68, 70 and 72 invert every other bit at the output of the shift register 64. The output of each stage of the shift register 64 is connected to gating circuitry 74 which has four input gates and two output gates as indicated. One of the output gates is connected to inverter 76. The other output gate is connected to inverter 78. The inverted signals from inverters 76 and 78 are applied to the NOR circuit 80 which functions as a summing circuit.

Those skilled in the art will recognize that the shift register 64, together with the inverters 66–72, gating circuitry 74, inverters 76, 78 and summing circuit 80 function as a preamble detector. The preamble signal is eight alternating 1 and 0 bits. The presence of the preamble at the input of shift register 64 is decoded by the inverters and gating circuitry so that a set pulse appears at the output of the summing circuit 80.

The set signal from summing circuit 80 triggers a flip-flop circuit which consists of two crossed NOR circuits 84 and 86. In other words, the crossed NOR circuits 84 and 86 from the flip-flop circuit 42 illustrated in FIG. 1.

The output pulse of the flip-flop is applied to one terminal of the combined address and PN generator 82 is described in more detail hereinafter. As shown, the PN generator also receives positive going clock pulses $Q_2$ at another terminal. For simplicity, one exclusive OR circuit 83 is shown connected in the feedback summing circuit to be described hereinafter. For purposes of the invention thus far described, it is sufficient to state that the PN generator is triggered by the pulse derived from flip-flop circuit 84–86. The output of the PN generator is applied to the exclusive OR circuit 85 as shown. The other terminal of the exclusive OR circuit 85 receives the delayed inverted data signal Data "D". In this fashion incoming data is synchronized with the local clock.

Each time there is a match between a bit in the data signal Data "D" applied to one terminal of the exclusive OR 85, and a PN generator bit applied to the other terminal, the 0 output of the exclusive OR appears at the terminal of the exclusive OR inverter 88. The inverted signal is then applied to one terminal of the NOR gate 90. The other terminal of the NOR gate 90 has been set by the flip-flop circuit 84–86 which went from a 1 to a 0 when the preamble was detected.

The function of the NOR gate 90 is to assure that there is always a 0 at its output except during a true incoming data sequence. There is always a 0 at the output of NOR gate 90 as long as there is a 1 at its input. The 1 is supplied by the flip-flop 84–86. Gate 90 inhibits a random match. As such it can be a flip-flop or any other equivalent type of gate. The combination of a signal at one terminal of the NOR gate 90 as derived from the exclusive OR circuit 85 through the inverter 88, and a 0 as derived from the flip-flop circuit during the sequence results in a 1 or 0 at its output as derived from exclusive OR circuit 85. This output is applied to the resistor-capacitive integration network 92. The network 92 includes series resistor R31 connected through capacitor C35 to ground. The voltage divider consisting of resistors R32 and R33 is connected in parallel with the capacitor C35.

The integration network 92 will provide a voltage of a predetermined value on the conductor 94 only if there is a complete match in the exclusive OR circuit 85 between the incoming signal and the signal generated in PN generator 82; that is, the voltage is a sum of matches. Any other random combination of signals will amount to less than that value (e.g., one-half voltage). Thus, the integration circuit 92 functions as a threshold detector for the presence of a matched or correlated signal.

A matched signal voltage is applied by conductor 94 to one terminal of the NOR circuit 96. NOR circuit 96 is cross connected with the NOR circuit 98 to form a flip-flop. The flip-flop consisting of cross connected NOR circuits 96 and 98 is energized by a voltage supply through switch 100. The flip-flop 96-98 forms part of the audio control 40 illustrated in FIG. 1. Thus, the presence of a pulse of sufficient voltage in integration circuit 92 results in the generation of a further pulse which is applied to one terminal of the NOR gate 102. The signal applied to the other terminal of the NOR gate 102 consists of the inverted 4.55 KHz signal $\overline{CK}$. Thus, gate 102 allows signal $\overline{CK}$ to be applied through resistor R29 to amplifier 104, and then to a transducer which takes the form of a speaker 48.

As shown, the inverted clock signal $\overline{Q}_2$ is derived from the divide by 4 circuit 62 and applied to the seven stage counter 106. When the counter 106 reaches a predetermined count, a signal is applied to the flip-flop 84–86. This resets the flip-flop to its original condition thereby removing the necessary signal from NOR gate 90. Thus, the circuit returns to its original state.

Figure 4:
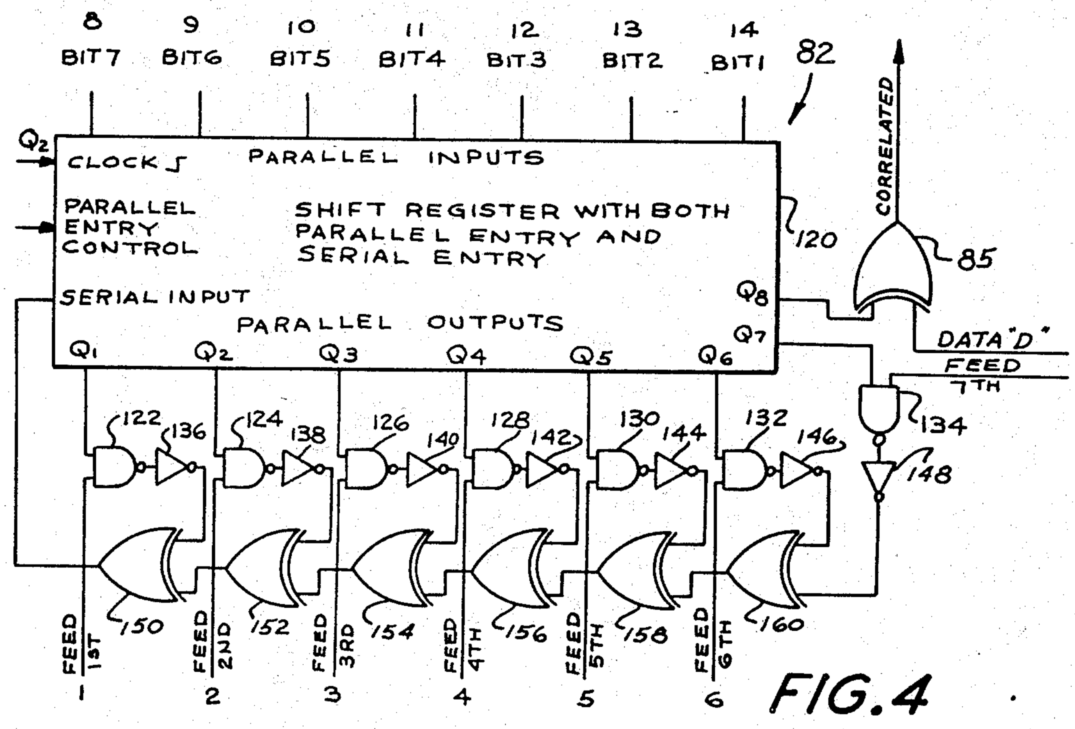
FIG. 4 is a logic diagram of a pseudo-random sequence generator constructed in accordance with the present invention.

Referring now to FIG. 4, the method for measuring the autocorrelation between the incoming signal by comparing it term by term with a locally generated signal is illustrated. This is accomplished primarily by using a maximal-length binary shift register capable of generating a predetermined number of sequences. This is in effect a pseudo-random pattern of binary bits. Thus, for a particular set of bits initially entered into the shift register, and for a particular set of open or closed gates in its output, the shift register will generate a particular sequence in response to clock pulses. The number of stages in the shift register determines the number of bits generated in the output before a particular sequence begins to repeat.

Advantage of this concept is taken in the present invention by providing an exclusive OR summing circuit which generates a 0 signal each time there is a match between a bit on the output of the PN generator and a bit in the signal. This concept is best understood by reference to FIG. 4 wherein the address and PN generator 82 is shown in detail.

The address and PN generator 82 comprises an eight stage shift register as shown. Of course, those skilled in the art will recognize that a greater or lesser number of stages can be provided. The clock signal $Q_2$ is inserted into the seven stage shift register 120. Parallel entry control is also derived from the preamble detector. The parallel outputs of the shift register 120 are each connected to one input of a NAND circuit. Thus, output Q1 is connected to one terminal of NAND circuit 122; output Q2 is connected to one terminal of NAND circuit 124; output Q3 is connected to one terminal of NAND circuit 126; output Q4 is connected to one terminal of NAND circuit 128; output Q5 is connected to one terminal of NAND circuit 130; output Q6 is connected to one terminal of NAND circuit 132; and output Q7 is connected to one terminal of NAND circuit 134. Output Q8 is connected to exclusive OR circuit 85. The output of each NAND circuit 122–134 is connected to one of the inverters 136, 138, 140, 142, 144, 146 and 148, respectively. Each inverter 136–148 inverts the output of their respective NAND circuits 122–134.

The output of each of the inverters 136–146 is fed to one terminal of one of the exclusive OR circuits 150–160. The output of the inverter circuit 148 is fed to the other terminal of the exclusive OR circuit 160. It should also be noted that the output Q7 is connected to one terminal of the exclusive OR circuit 86. The output of the exclusive OR circuit 150 is fed to the serial input terminal of the shift register 120.

From the foregoing, it should be apparent that the combination NAND, inverter and exclusive OR circuitry provides a summing feedback network to the first stage of the shift register 120.

In operation, the address peculiar to each receiver is programmed into the parallel inputs 8–14. In the preferred form of the embodiment, this program is hard wired in. However, software could be used if desired. The first seven bits of the address are fed into the parallel inputs. As shown, Bit 7 is programmed into input 8, Bit 6 is programmed into input 9, and so forth with Bit 1 being programmed into input 14. This sets the flip-flop circuits in the shift register and provides either a 1 bit or a 0 bit in the parallel outputs Q1–Q7.

In a like manner, an appropriate feed of 1 or 0 level signals are applied to the feed inputs 1–7. The feed is also hard wired in, although a soft program could be used if desired. The feed inputs 1–7 establish the appropriate feedback peculiar to the PN generator. Stated otherwise, the feed signals define the starting state and sequence of the generator.

From what has been described with respect to the circuit illustrated in FIG. 3, it should be apparent that whenever there is a signal detected by the receiver and applied to the audio amplifier 10, a clock signal $Q_2$ results. This clock signal is applied to the PN generator.

As a result, the PN generator commences to generate a sequence or pattern of 1's and 0's. The time window for this sequence is determined by the counter 50, which in the preferred embodiment is 127 clock pulses plus 1 pulse for the resetting, for a total of 128 pulses.

During the same time sequence, the Data "D" incoming signal, delayed by one bit, and also clocked for system synchronization, is applied to the exclusive OR circuit 85. The initial clock signal also shifts the shift register from parallel entry to serial entry. Thus, with the circuit in the condition thus far described, the operation of the PN generator is as follows.

A 0 level signal on feed 6 assures that there is a 1 at the output of the NAND gate 132 regardless of whether there is a 1 or 0 at parallel output Q6. Inverter 146 therefore assures that there is a 1 at the input to exclusive OR 160. A fixed 1 at the input of an exclusive OR assures that the other input will appear in its output. This, with a fixed 1 at one input of exclusive OR 160, there will be a 1 or 0 at its output, depending on whether there is a 1 or 0 bit at its other input. The other input is connected to Q7 through its NAND gate and inverter. Accordingly, given a 1 on feed 6, the output of Q7 is fed to the exclusive OR circuit 158 associated with Q5. Stated otherwise, a 1 on feed 6 effectively removes its exclusive OR circuit 160 from the circuit.

Now to consider the second possibility, namely a 0 at one of the feed inputs. A 0 at feed 5 means that the NAND gate 130 inverts the bit Q5. This is again inverted in inverter 144. Therefore, exclusive OR 158 has both Q5 and Q7 as its inputs. The output of exclusive OR 158 will depend upon whether these inputs are both 1's, both 0's or one of the two combinations of 1's and 0's.

This process of either removing an exclusive OR from the circuit or using it to sum with the output of the preceding parallel output Q1–Q7 continues, as determined by whether a particular feed has a 1 or 0 on it. The resulting string of bits is fed from exclusive OR 150 back into the serial input of the PN generator. This results in a known pattern of 1's and 0's at Q7. The known pattern is defined by the starting state at the parallel inputs and the parallel feeds. The pattern repeats after 127 bits. However, a repetition is prevented in the present circuit because a reset pulse at the 128th bit sets the shift register back to its starting state. Thereafter, the PN generator waits for the next signal.

The known pattern at Q7 is also derived at Q8 and applied to the exclusive OR circuit 85. The Data "D" signal is also applied to the exclusive OR signal. The output at Q8 is the same as Q7, shifted by one bit. If there is a match between the Data "D" signal and the sequence of signals at Q8, the integrating circuit 92 integrates this match up to a voltage level which will trip the audio amplifier in the manner heretofore explained. If there is no match, then the PN generator is reset on the 128th bit to wait for the next address signal.

The present invention may be embodied in other specific forms without departing from the spirit or essential attributes thereof and, accordingly, reference should be made to the appended claims, rather than to the foregoing specification as indicating the scope of the invention.

I claim:

1. In a receiver for a communication system, said receiver including acquisition means for detecting a signal, said signal having a data signal comprised of a preamble and a pseudo-random code, a preamble detector for detecting said preamble and generating a start signal in response to the detection of said preamble, a clock circuit for generating a clock signal in response to the detection of said data signal by said acquisition means, a local pseudo-random generator means, said local pseudo-random generator means generating all maximal length pseudo-random sequences up to the degree N, where N is the number of stages used, said local pseudo-random generator means including a shift register having a fixed number of stages and parallel outputs, means for connecting an exclusive OR circuit to each output of said shift register, the output of each said exclusive OR circuit being connected to one of the inputs of a succeeding exclusive OR circuit, the output of the last exclusive OR circuit being connected to a serial input of said shift register, said means connecting each exclusive OR circuit to the output of said shift register including means to determine whether a steady 1 or a steady 0 is applied to the other of the inputs of said exclusive OR circuit, said local pseudo-random generator means being energized in response to said start signal to produce a local pseudo-random generator code output, gating means, said gating means including an exclusive OR circuit having a first and a second input, said local pseudo-random code output being applied to said first input of said exclusive OR circuit and said data signal being applied to said second input of said exclusive OR circuit, said gating means producing an output only when said first and second inputs of said exclusive OR circuit are identical, and threshold detector means for detecting a predetermined number of coincidences on said first and second inputs of said gating means.

2. In a receiver for a communication system in accordance with claim 1 wherein the threshold detector means comprises means to integrate the output of said gating means.

3. In a receiver for a communication system in accordance with claim 1 wherein said means connecting an exclusive OR circuit to each output of said shift register comprises a NAND gate and an inverter connected to the output of said NAND gate.

4. In a receiver for a communication system in accordance with claim 1 including means for determining the autocorrelation sum between said pseudo-random code of said data signal and said local pseudo-random code output of said local pseudo-random generator means.

5. In a receiver for a communication system in accordance with Claim 1, said receiver including a binary counter for resetting the local pseudo-random generator means at the end of a predetermined count.

* * * * *